March 20, 1951     W. F. MASEK     2,545,740
ESCALATOR
Filed April 18, 1946
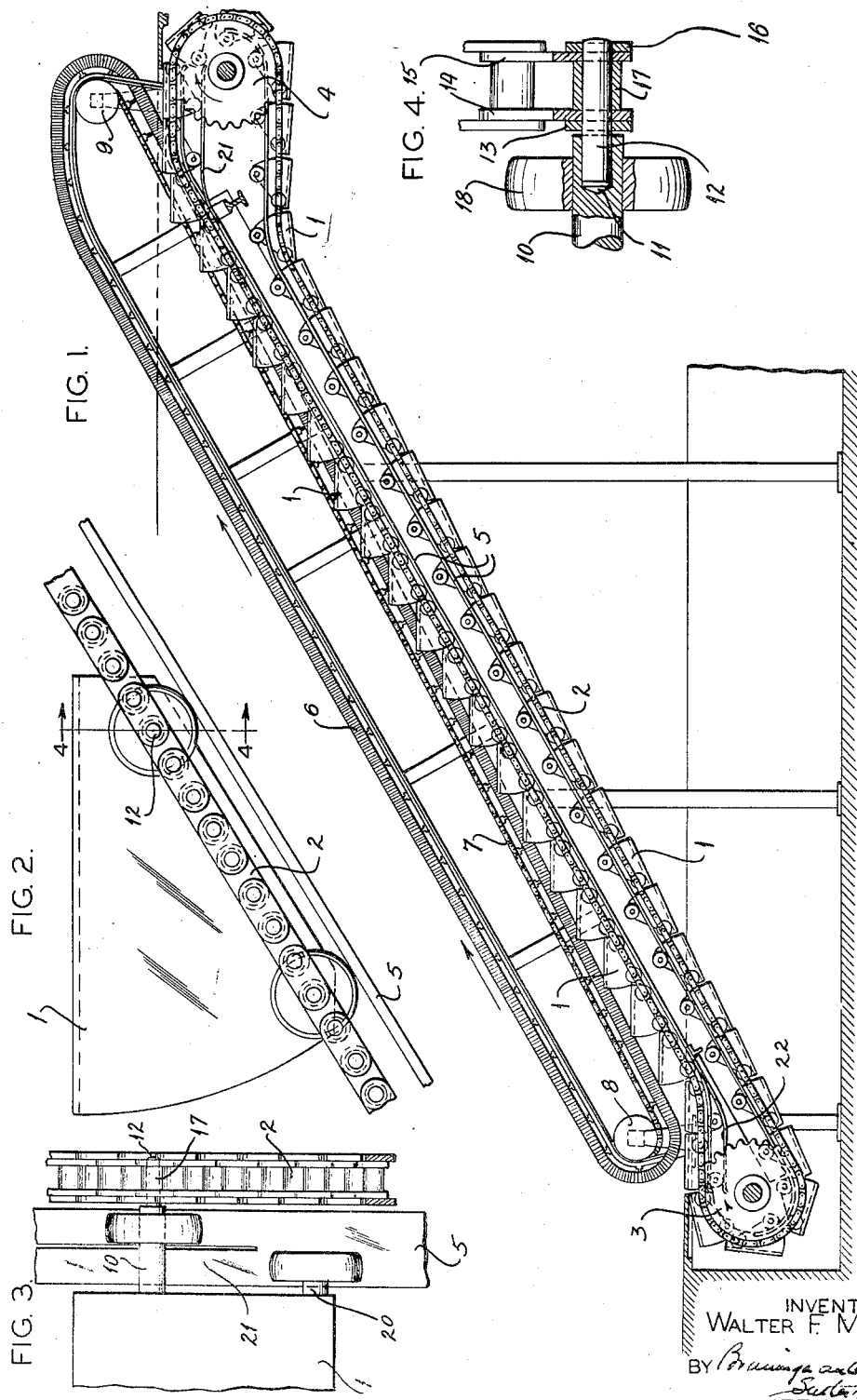
INVENTOR:
WALTER F. MASEK
BY
ATTORNEYS.

Patented Mar. 20, 1951

2,545,740

UNITED STATES PATENT OFFICE 2,545,740

ESCALATOR

Walter F. Masek, Coffeyville, Kans., assignor to Multiscope, Inc., Coffeyville, Kans., a corporation of Kansas Application April 18, 1946, Serial No. 663,222

4 Claims. (Cl. 198—16)

1

This invention relates generally to escalators and particularly to the driving connection between the movable stair members and the source of motive power.

In escalators, as generally constructed, a plurality of stair members are arranged to be guided along the track and are generally driven by an endless chain. In order to transmit an elevating force from the endless chain to the individual stair members, it has heretofore been the general practice to extend a shaft from the stair members through the endless chain in such manner that the shaft itself consituted one of the transverse link increments of the chain. Any such arrangement, however, precludes the possibility of utilizing standard roller chains unless inordinately large chains are employed, thereby adding unnecessarily to the expense of the device.

The object of the present invention, generally stated, is to provide a simplified and inexpensive connection between a roller-drive chain and the stair members of an escalator.

Other objects will become apparent when the following description is read in connection with the accompanying drawings, in which:

Figure 1 is a view in side elevation of an escalator embodying the present invention;

Figure 2 is an enlarged detail view in side elevation of a single stair member showing its association with the drive chain;

Figure 3 is a plan view of the parts shown in Figure 2; and

Figure 4 is a sectional view taken along the line 4—4 of Figure 2.

In accordance with the present invention, generally stated, a driving connection between the individual stair members of an escalator and their endless drive chains is accomplished without requiring the use of drive chains of a magnitude such that the strength of the chain is out of proportion to the requirements of use. The present invention contemplates the use of a relatively small endless roller-drive chain having only sufficient strength, plus a reasonable factor of safety, to withstand the loads to which it is subjected in use. In order to accomplish this result, a standard endless roller chain having the selected appropriate strength factors is provided and, at spaced intervals along such chain, one of the transverse pins upon which the roller is mounted is removed and replaced by a pin of the same diameter, but of greater length than the original pin, so as to provide an axial extension of the pin beyond the links on one side of the chain. Such axially elongated pin receives

2 and retains the roller and interconnects the original links in precisely the same manner as the shorter pin replaced thereby, but the axially elongated pin is internested with a part of the stair member which extends in close adjacence to the side links of the drive chain. When such part of the stair member is the axle upon which the wheels thereof are rotatably mounted, the axial extension of the chain-pin may be nonrotatably secured within a counterbore in such axle and, since the axle can extend in close adjacence to the side links of the chain, the determining factor is the shearing strength of the elongated pin in the section adjacent the end of the axle.

Referring now to Figure 1 of the drawings, the escalator consists of a series of stair members 1 interconnected, in the manner hereinafter described more in detail, to an endless drive chain 2, which is in engagement with a driven sprocket 3 at the lower end thereof and another sprocket 4 at the upper end thereof.

A track 5 is provided for supporting the stair members 1 as they move upwardly or downwardly along the incline.

Operating alongside the series of stairs 1 is an endless hand rail 6, which, in the embodiment shown generally in the drawings, consists of a series of helically coiled spring sections joined end-to-end and connected at at least some of their junctures with an endless driving chain 7, which is driven by sprockets 8 and 9 at the opposite ends thereof. The details of the hand rail 6 are disclosed more fully in my co-pending application Serial No. 663,223, filed concurrently herewith.

The endless driving chain 2 is of the conventional standard roller type wherein a roller is mounted upon a pin, and, at each end of the roller, links extend in both directions to the next transverse pin and roller. In selecting the size of chain appropriate for use in connection with the present invention, the determining factor is the size of the pins upon which the rollers are mounted. The present invention contemplates that a chain be employed whose pins are of such diameter that an elongated one of the same diameter will have a shearing strength sufficient (with a reasonable factor of safety) to withstand the load to which it will be subject in dragging a loaded stair member up the incline track 5.

Having selected a standard endless roller chain of the desired size, the stair member 1 is provided with an axle 10 substantially larger in diameter than the pins of the roller chain. The axle 10 is axially bored, as shown at 11 in Figure 4, such axial bore preferably being of a diameter such as to provide a drive-fit with a pin of the same diameter as that in the selected roller chain.

As hereinbefore indicated, the usual pin of the roller chain is replaced with an elongated pin 12, which extends transversely substantially beyond the outermost link 13 on the side of the chain adjacent the end of axle 10. The axial extension of pin 12 is then internested within bore 11 in axle 10, preferably with a drive-fit, so as to be non-rotatable therein. With this arrangement, pin 12 is co-axial with axle 10 and, while the chain-link 13, as well as chain-links 14, 15, 16, are free for at least limited rotational movement about pin 12 and roller 17 is freely rollable thereon, it is preferred that no relative movement take place between the pin 12 and axle 10.

A wheel 18 is rotatably mounted upon the axle 10 adjacent the outer end thereof and preferably overlapping the bore 11 therein, as clearly shown in Figure 4. In order to minimize the moment on the section of pin 12 which will be in shear during operation of the device under load, it is advantageous to extend axle 10 to a position as closely adjacent to the link 13 as will not interfere with rotational movement of the latter about pin 12.

In the embodiment shown in the drawings, the stair member 1 is provided with two axles, the aforesaid axle 10 and a trailing axle 20. The latter is not directly connected to the drive chain 2 because, in the embodiment shown, its travel departs from the orbit of chain 2, as shown at 21, near the upper terminus of the escalator and throughout the entire bottom thereof, to point 22 near the lower terminus thereof.

The axle 10 may be a stub axle suitably secured to stair member 1 or may extend entirely thereacross with its opposite end connected to the opposite drive chain 2 in the manner illustrated in Figure 4.

From the foregoing description, those skilled in the art will understand the construction and operation of the invention and appreciate the advantage and economy accomplished by the interconnection of the stair member to the endless roller-drive chain in the manner described, with the attendant advantage of permitting the use of standard roller chains.

While the preferred embodiment has been described in detail, it is realized that the skilled in the art will readily envision minor variations and alterations thereof without departing from the spirit of the invention. It is, therefore, to be distinctly understood that the invention is not limited precisely to the details shown.

Having thus described the invention, what is claimed and desired to be secured by Letters Patent is:

1. In an escalator having an endless roller chain drive, said chain having roller-embraced pins connecting each of the links thereof, some of said pins being axially extended substantially beyond the links thereof, a series of movable stairs each having wheels mounted for rotation on the exterior of non-rotatable shafts, said shafts extending from said stairs and projecting through their respective wheels so as to terminate in close proximity to said chain, said shafts being larger in diameter than the pins of said chain and being axially bored to the diameter of said pins, each axial bore extending from the end of a shaft for a distance less than the distance between said chain and the remote face of the wheel thereadjacent, and said axial extensions of said pins being telescoped within said axial bores.

2. In an escalator having an endless roller chain drive, said chain having roller-embraced pins extending transversely at both ends of each link and all pins being the same diameter throughout the length of said chain, an inclined track, a series of stair members each having axles and wheels, said track and chain being arranged so that the orbit of the chain is substantially parallel to the orbit of the stair member axle when the wheels of the stair member roll along the track, said axles extending from the stair member through the respective wheels and terminating therebeyond in close proxmity to said chain, the end of the axle adjacent the chain having an axially extending bore of a diameter substantially corresponding to that of the chain pins, said bore terminating inwardly at a position outwardly of the inner face of the wheel thereadjacent and spaced ones of said chain pins extended beyond the chain into the bores of the respective axles.

3. In an escalator having a drive including a pair of endless roller chains wherein the successive links are interconnected by pins and the intermediate portions of the pins are embraced by rollers, a series of steps movable along a track substantially parallel with said endless chains, said steps being arranged between said chains and having paired wheels carried by axles which extend through said wheels in a direction parallel with the pins of the chains, the improvement which comprises the axle for one pair of wheels on each step having at each end thereof an axially extending bore, and spaced ones of said chain pins being extended into said bores respectively.

4. The improvement of claim 3 wherein the bores terminate inwardly at a position outwardly of the inner face of the respective wheels.

WALTER F. MASEK.

REFERENCES CITED

The following references are of record in the file of this patent:

UNITED STATES PATENTS

| Number | Name | Date |
|---|---|---|
| 899,933 | Wheeler | Sept. 29, 1908 |
| 2,085,076 | Dunlop | June 29, 1937 |
| 2,231,709 | Dunlop | Feb. 11, 1941 |

FOREIGN PATENTS

| Number | Country | Date |
|---|---|---|
| 388,744 | Great Britain | Feb. 27, 1933 |